United States Patent
Harano et al.

(10) Patent No.: US 7,064,307 B2
(45) Date of Patent: Jun. 20, 2006

(54) CONTAINER COMMONLY USABLE FOR ELECTROMAGNETIC COOKING HEATERS AND MICROWAVE OVENS

(75) Inventors: Shigenobu Harano, Kawaski (JP); Satsuki Kosaka, Kawasaki (JP); Toru Ikeda, Kawasaki (JP)

(73) Assignee: Ajinomoto Co., Inc., Tokyo (JP)

( * ) Notice: Subject to any disclaimer, the term of this patent is extended or adjusted under 35 U.S.C. 154(b) by 60 days.

(21) Appl. No.: 10/704,546

(22) Filed: Nov. 12, 2003

(65) Prior Publication Data

US 2004/0144777 A1    Jul. 29, 2004

(30) Foreign Application Priority Data

Nov. 11, 2002    (JP) ............................... 2002-327155

(51) Int. Cl.
*B23K 35/38*    (2006.01)

(52) U.S. Cl. ...................... 219/725; 219/726; 219/727; 219/728; 219/729; 219/730; 219/732; 219/735; 99/DIG. 14

(58) Field of Classification Search ........ 219/725–735, 219/755, 759; 99/DIG. 14
See application file for complete search history.

(56) References Cited

U.S. PATENT DOCUMENTS

| 4,478,349 | A | * | 10/1984 | Haverland et al. | ....... 220/573.4 |
| 5,173,580 | A | * | 12/1992 | Levin et al. | ................ 219/730 |
| RE34,829 | E | * | 1/1995 | Stone | ......................... 219/730 |
| 6,586,715 | B1 | * | 7/2003 | Watkins | ..................... 219/725 |

* cited by examiner

*Primary Examiner*—Shawntina Fuqua
(74) *Attorney, Agent, or Firm*—Oblon, Spivak, McClelland, Maier & Neustadt, P.C.

(57) ABSTRACT

A container commonly usable for electromagnetic cooking heaters and microwave ovens. A resin container commonly usable for electromagnetic cooking heaters and microwave ovens having an aluminum thin, film on the bottom thereof for storing food therein. The aluminum thin film is 5–30 μm in thickness and 70 $cm^2$ in area, and has no projections having a curvature radius of less than 2 cm over the entire surface thereof. The aluminum thin film covers 30–80% of the bottom area of the container.

8 Claims, No Drawings

CONTAINER COMMONLY USABLE FOR ELECTROMAGNETIC COOKING HEATERS AND MICROWAVE OVENS

FIELD OF THE INVENTION

The present invention relates to a container, which can be commonly used for both electromagnetic cooking heaters and microwave ovens.

DESCRIPTION OF THE RELATED ART

Hitherto, there are various types of known containers specifically designed for electromagnetic cooking heaters or microwave ovens. Today, microwave ovens are present in a majority of households, and electromagnetic cooking heaters are becoming more prevalent especially due to an increase in use within large multiple dwelling houses. Cooking methods in conjunction with these two types of equipment differ in principal from each other, and thus it has been considered to be practically difficult to obtain a container, which can be used for these two cooking methods. In other words, a synthetic resin container, which can be used in microwave ovens, cannot be used in electromagnet cooking heaters since the synthetic resin container gets soft when it is heated. Additionally, metallic containers used in electromagnetic cooking heaters are not suitable for heating in microwave ovens because the metallic container resists transmission of microwaves, causing heating unbalance or sparks from the edge of the metallic material. JP-UM-A-60-182311 describes a container for electromagnetic cooking heaters provided with a thin film of magnetic metal on at least the inner bottom of a molded container formed of a synthetic resin sheet.

JP-UM-A-61-26075 describes a common container for electromagnetic cooking heaters and microwave ovens including an outer container formed of resin material, an inner container formed of aluminum, and a magnetic material interposed between the inner and the outer containers only at the bottom. It describes that this construction enables effective heating of the magnetic material by the electromagnetic cooking heater and transmission of heat of the magnetic material to aluminum, so that the contents can be heated effectively. According to this arrangement, since microwaves enter from above or from the side when used in the microwave oven and since the disposition of the magnetic material is limited to the bottom, then effective heating is enabled.

According to JP-A-2000-68042, an inventor determined that, in spite of the fact that the aluminum thin film is a nonmagnetic material, heating by electromagnetic induction is enabled when the thickness of the aluminum layer is reduced to a thickness of between 5 to 50 μm. Thus, this reference describes a container for an electromagnetic cooking heater that includes an aluminum thin layer at the bottom of the container and a non-guide type holding layer as an outermost layer. However, there is no statement relating whether or not the container can be used also as a container for microwave ovens. Though there is no statement about the relationship between the bottom area of the container and the area of the aluminum thin film in the text, it is clear from FIG. 1 that these two areas are the same. However, when the entire bottom of the container is covered by nonmagnetic metal or conductive metal such as the aluminum thin film, microwaves cannot enter into the container since the microwaves would be blocked by conductive metal such as the aluminum thin film. Therefore, there arise such problems that heating efficiency of the microwave oven is lowered, or remarkable variations in heating temperature may result and thus effective cooking cannot be expected.

JP-A-2000-85853 describes a container commonly usable for electromagnetic cooking heaters and microwave ovens achieved by providing a container formed of synthetic resin and a metallic container that resists heating by direct flame and by the electromagnetic cooking heater and combining these containers detachably into a dual-structure.

JP-A-2002-177149 describes a container commonly usable for electromagnetic cooking heaters and microwave ovens achieved by placing a detachable magnetic plate member on the bottom of the container.

SUMMARY OF THE INVENTION

The present invention advantageously provides a cooking container which is commonly and effectively usable both for electromagnetic cooling heaters and microwave ovens. The present invention achieves such a cooking container without the need for attaching or detaching components. More specifically, the present invention provides a container commonly usable for electromagnetic cooking heaters and microwave ovens by using an aluminum thin film as a heating element for heating with the electromagnetic cooking heater and establishing conditions under which microwaves of the microwave oven can pass through the bottom of the container. Hence, the heating of food becomes effective by determining a suitable ratio between the configuration and the area of an aluminum thin film and the bottom area of the container.

In order to develop a container commonly usable both for electromagnetic cooking heaters and microwave ovens, the inventors have been studying to obtain various conditions such as a gap that microwaves of the microwave oven can pass through, a size of a conductive metallic shield that obstructs passage of microwaves, and a configuration of the conductive metallic shield that can avoid defects such as flying sparks, as well as the lower limit of the heat value of the aluminum thin film as heating element that can be used practically as electromagnetic cooking heater, and found that the relation between the area of the aluminum thin film and the bottom area of the container is regular, thereby reaching completion of the present invention.

A first aspect of the present invention is a container commonly usable for electromagnetic cooking heaters and microwave ovens including a resin container having an aluminum thin film on the bottom thereof for storing food, where the aluminum thin film has a thickness of between 5 to 30 μm and an area of at least 70 cm$^2$. Additionally, the aluminum thin film has no projection of less than 2 cm in curvature radius over the entire surface of the aluminum thin film, and the bottom of the container is covered by the aluminum thin film by 30 to 90% of the entire area thereof.

A second aspect of the present invention is a container commonly usable for electromagnetic cooking heaters and microwave ovens where the aluminum thin film is a plane including a hollow portion, and the largest diameter of the hollow portion is at least 6 cm.

A third aspect of the present invention is a container commonly usable for electromagnetic cooking heaters and microwave ovens where the heat value of the aluminum thin film is at least 7.0 kcal/min when being used in an electromagnetic cooking heater with an output of at least 1 kW and/or at least 3.3 kcal/min when being used in a microwave oven with an output of at least 0.4 kW.

A fourth aspect of the present invention is a container commonly usable for electromagnetic cooking heaters and microwave ovens where food to be stored in the container is preferably containing liquid component of at least 30 weight percent, and the viscosity of the liquid component is at most 130 cp at a temperature of 60° C.

PREFERRED EMBODIMENT OF THE INVENTION

A first characteristic of the present invention is a resin container for storing food and having an aluminum thin film on the bottom thereof. The aluminum thin film used here may be an aluminum thin film that is commercially available. The container according to the present invention is a heat-resistant resin container for storing food therein, and a container commonly useable for electromagnetic cooking heaters (or electromagnetic induction cooking heaters) and microwave ovens in which the aluminum thin film is provided on the bottom of the container of at least 105 mm in diameter over the area of 30 to 80% thereof.

The purity of aluminum makes no specific difference, however commercially available aluminum of about 99% in purity is satisfactory. Preferably, the thickness of the aluminum thin film is 5 to 30 µm, and, more preferably, 7 to 20 µm. The aluminum thin film is essentially nonmagnetic material, and thus when the thickness exceeds 100 µm, it cannot be heated by the electromagnetic cooking heater, and thus it cannot be used as a container for electromagnetic cooking heaters. The aluminum thin film of 5 µm in thickness is at least practical since the aluminum thin film of a thickness up to 6 µm is available, and that of a thickness from 7 to 20 µm is proved to have a sufficient practicality. However, the aluminum thin film less than 5 µm is not practical because it is hard to manufacture and handle as a unitary construction of metal foil. The aluminum thin film according to the present invention may be formed of a lamination including a thin heat-resistant resin, though it may be a single layer.

The aluminum thin film needs an actual area of at least 70 $cm^2$ for functioning as a heating element for electromagnetic cooking heater. An area of less than 70 $cm^2$ is not practical when being used for cooking on the electromagnetic cooking heater, because the heat value of the material to be heated is not sufficient and thus the food cannot be heated enough. The upper limit of the area of the aluminum thin film relates to the size of the heating element of the electromagnetic cooking heater in terms of practicality, and thus when the size of the electromagnetic cooking heater increases in the future, the area of the aluminum thin film can certainly be increased correspondingly. The heat value required for the electromagnetic cooking heater with an output of at least 1 kW is 7.0 kcal in terms of practicality. The area required for generating this heat value is a circle of at least 95 mm in diameter in case of a continuous flat circular aluminum thin film.

In the container according to the present invention, the relation between the bottom area of the container and the area of the aluminum thin film as heating element is important. The bottom area (Sc) of the container is preferably always larger than the area (Sh) of the aluminum thin film, and the ratio is preferably such that the value of Sh/Sc is within the range from 0.3 to 0.8. When the aluminum thin film having an area exceeding 0.8 times the bottom area (Sc) of the container is used, it severely intercepts microwaves from entering into the container from the bottom of the container when being cooked in the microwave oven, and thus microwaves are obliged to enter into the container through the side wall or from the top surface. Therefore, heating efficiency is lowered, and an uneven heat generation may be induced. When being cooked electromagnetically, the heat generated from the periphery of the aluminum thin film can hardly be transmitted to food stored in the container, and thus there may arise a disadvantage such that the resin portion of the container at the periphery of the bottom surface is melted, which is not preferable in the present invention which proposes a container commonly usable for electromagnetic cooking heaters and microwave ovens. When the value of Sh/Sc is less than 0.3, disadvantageously, the heat generated from the aluminum thin film is hardly transmitted evenly to the entire food stored in the container.

The peripheral shape of the aluminum thin film according to the present invention is not necessarily required to be a circle. However, it is not preferable that a projection having a curvature radius of less than 2 cm is present over the entire surface of the aluminum thin film. When the projection having a curvature radius of less than 2 cm is present, a concentration of the electric charges occurs at the projection during heating in the microwave oven, and when the concentration of electrical charges becomes great, then sparks are disadvantageously generated from the projection.

The aluminum thin film is not necessarily required to be a uniform continuous shape, and may include a hollow portion. The hollow portion may be formed along the outer periphery of the bottom of the container and may be formed in the vicinity of the center of the bottom. The position of the hollow portion is not specifically limited. The shape may be any of a circle, an oval, a square, a polygon, a shape of cloud, and so on as long as there is no projection having a curvature radius is less than 2 cm. There may be a plurality of hollow portions. The largest diameter of the hollow portion is preferably 6 cm, and an improvement in heating efficiency and even heating may easily be achieved by microwaves incoming through the hollow portion when being heated in the microwave oven.

The aluminum thin film is not necessarily required to be a continuous single film. A pair of two substantially semi-circular films may be employed, and three or more pieces may be used, as long as there is no projection of which the curvature radius is less than 2 cm and the area of each aluminum thin film is at least 70 $cm^2$. Since this arrangement allows microwaves generated when being heated in the microwave oven to enter into the container through gaps formed among these films when being cooked in the microwave oven, effective heating efficiency with respect to food in the container is achieved.

The bottom of the container of the present invention is not necessarily covered evenly with the aluminum thin film. A portion not covered by an aluminum thin film can exist on the bottom of the container and such portion may be formed along the outer periphery of the bottom of the container or in the vicinity of the center of the bottom surface. The position is not specifically limited. The shape of an uncovered portion may be determined as desired, and may be a shape such as a circle, an oval, a square, a polygon, a shape of star, a shape of cloud, and so on. There can be a plurality of uncovered portions. The aluminum thin film is not necessarily required to be a continuous single film. There may be a pair of two semi-circular films, or three or more of those may be employed. In this arrangement, since microwaves generated when being heated in the microwave oven can enter into the container through these gaps when being cooked in the microwave oven, and thus efficient heating effect with respect to food in the container may be obtained.

In order to show a method of manufacturing the container laminated with the aluminum thin film employed in the present invention, the following two methods are exemplified. However, a method of manufacturing the container is not limited to these two methods. One is a method of heating and molding a resin sheet in a state in which an aluminum foil or a lamination of aluminum foil and a heat-resistant resin cut out into a predetermined shape in advance is disposed and aligned to a predetermined position on the bottom of the container. The other is a method including the steps of laminating an aluminum foil and a resin sheet in advance, masking the aluminum foil in a predetermined shape, removing the unnecessary portion of the aluminum foil, and heating and molding the obtained foil laminated resin sheet of a specific shape.

In the present invention, a method of disposing the aluminum thin film on the inner side of the bottom of the container is not specifically limited, and thus the aluminum thin film or the aluminum thin film lamination may simply be placed on the bottom of the resin flat-bottom container, or may be fitted into a recess formed on the bottom of the resin flat-bottom container into the same shape. A method to fit the hollow portion of the aluminum thin film to the projection provided on the bottom of the resin flat-bottom container having the same shape as the hollow portion is also preferable. It is also possible to provide a resin container formed by laminating aluminum thin films. In any of these methods, it is preferable to arrange the aluminum thin film on the inner surface of the bottom of the container at the position close to the contents. Even when the heat-resistant resin layer is interposed with respect to the contents, the thickness of the heat-resistant resin layer is preferably 50 microns at the maximum. Arrangement of the aluminum thin film on the outside of the bottom of the container is not preferable because the heat generated from the aluminum thin film when being heated by the electromagnetic cooking heater melts and destroys the resin container at the same time as the contents of the container is heated.

The shape and size of the container of the present invention are not specifically limited as long as it is a flat bottom shape suitable for heating by the electromagnetic cooking heater, and may be determined based on the usability in daily cooking. Normally, containers of 200 to 500 ml in capacity, in the shape of a circle, an oval, a rounded square, a rounded polygon, or a racetrack formed by connecting two semi-circular arcuates with straight lines are preferably used. A container having a capacity of 1000 ml is also usable. The bottom surface of the container is not necessarily required to be smooth, and there may be rough surfaces within ⅟10 of the longer diameter of the container, or there may be an elevated circular base formed on the bottom in the vicinity of the outer periphery of the bottom surface thereof.

Food to be stored in the container according to the present invention preferably contains a liquid component of at least 30 weight percent, and food of 130 cp in viscosity at 60° C., such as soup with various ingredients, e.g., Tonjiru (pork miso-soup), miso-soup, oil, hot-water, and Sake. Anv food is acceptable as long as there are ingredients contained therein and those ingredients are covered by liquid. Even when the ingredients are not completely covered by liquid and appear on the liquid, if it contains sufficient amount of liquid to such an extent that gives the ingredients buoyancy or if it is devised to give the ingredients buoyancy, so that the same part of the ingredients are not always kept in contact with the container when being heated, it is also acceptable. For example, Udon (noodles) with ingredients or Hotpot will be well suited. As other foods, for example, deep-frozen foods, which are solid at room temperatures, such as frozen soup or frozen Oden (Japanese hotchpotch) are also well suited. Such frozen foods can be cooked without a problem as long as liquid or soup is made when the food is thawed and the ingredients are sufficiently covered by liquid. However, foods with ingredients, such as curry or stew, which contains only a small amount of water content and exceeds 130 cp at 60° C. in viscosity are not preferable because of the lack of uniformity when being heated, and because the container may become damaged.

EXAMPLES

The present invention will be described based on the following examples.

Cooking Equipment Used:

Electromagnetic Cooking Heater:

KZ-PW1 1000-1400 W

Matsushita Electric Industrial Co., Ltd.

Microwave Oven:

RE-S100 500 W

Sharp Corporation.

Method of Measuring Heat Value

The heat value was calculated by filling 300 ml of water in the container, heating it by the electromagnetic cooking heater or the microwave oven until it was brought to a boil, and measuring the temperature before heating and the time period until it was brought to a boil.

Example 1

Manufacture of a Container 1

A polypropylene sheet of 500 μm in thickness was obtained by extruding polypropylene resin (Grand Polymer CJ102 from JPO) into a sheet by a T-die, and cooling it down. Then, a resin container formed of polypropylene of 120 mm in diameter of the bottom surface was obtained by forming the obtained sheet into a circular tray by a vacuum molding method. An aluminum thin film having the same area and the same shape as the bottom surface of the obtained container and being 7 μm in thickness was cut out, and a hole of 65 mm in diameter and being concentric with the aluminum thin film was formed. The obtained aluminum thin film was disposed as a heating element on the bottom of the container to form the container 1.

Example 2

Manufacture of Container 2

A container 2 was obtained using the same method as the example 1 except that the thickness of the heating element, which corresponds to the aluminum thin film, was increased to 15 μm.

Example 3

Manufacture of Container 3

A container 3 was obtained using the same method as the example 1 except that the thickness of the heating element, which corresponds to the aluminum thin film, was increased to 20 μm.

Example 4

Manufacture of Container 4

A container 4 was obtained in the same manner as the example 1 except that the circular bottom of the container was increased into 140 mm in diameter; the aluminum thin film to be disposed on the bottom of the container was 15 μm in thickness and 120 mm in diameter without a hole.

Example 5

Manufacture of Container 5

A container 5 was obtained in the same manner as the example 1 except that the bottom of the container was circular of 180 mm in diameter without a hole.

Example 6

Manufacture of Container 6

A container 6 was manufactured in the same manner as the example 1 except that the bottom of the container was 140 mm in diameter, that a circular aluminum thin film of 15 μm in thickness and 140 mm in diameter was formed with a hole of 6 cm in diameter, and that the center of the hole was aligned with the centerline of the circular aluminum thin film and two holes are formed so that the outer peripheries of the holes were positioned at 5 mm from the outer periphery of the aluminum thin film.

Comparative Example 1

Manufacture of Container 7

A container 7 was obtained in the same manner as the example 1 except that the thickness of the heating element, which corresponds to the aluminum thin film, was increased to 100 μm.

Comparative Example 2

Manufacture of Container 8

A container 8 was obtained in the same manner as the example 1 except that a hole of 30 mm in diameter was formed at the center of the heating element, which corresponds to the aluminum thin film.

Comparative Example 3

Manufacture of Container 9

A container 9 was obtained in the same manner as the example 1 except that a hole of 82 mm in diameter was formed at the center of the heating element, which corresponds to the aluminum thin film, and the area of the aluminum thin film was 60 $cm^2$.

Comparative Example 4

Manufacture of Container 10

A container 10 was obtained in the same manner as the example 1 except that an aluminum thin film being the same as the bottom of the container, which was 80 $cm^2$ in bottom area and 101 mm in diameter, was employed.

The dimensions of the containers 1–10 are shown in Table 1.

TABLE 1

| | Container | | | | | | Sh | | | |
|---|---|---|---|---|---|---|---|---|---|---|
| No | Sc bottom area ($cm^2$) | Bottom diameter (mm) | Aluminum thin film Shape | Thickness (μm) | B1 entire area ($cm^2$) | Outer diameter (mm) | B2 hole area ($cm^2$) | hole diameter (mm) | B1–B2 actual area ($cm^2$) | Sh/Sc × 100 (%) |
| 1 | 113 | 120 | Doughnut | 7 | 113 | 120 | 33 | 65 | 80 | 71 |
| 2 | 113 | 120 | Doughnut | 15 | 113 | 120 | 33 | 65 | 80 | 71 |
| 3 | 113 | 120 | Doughnut | 20 | 113 | 120 | 33 | 65 | 80 | 71 |
| 4 | 154 | 140 | Circle | 15 | 113 | 120 | — | — | 113 | 73 |
| 5 | 254 | 180 | Circle | 15 | 113 | 120 | — | — | 113 | 44 |
| 6 | 154 | 140 | Doughnut × 2 | 15 | 154 | 140 | 28 × 2 | 60 | 98 | 64 |
| 7 | 113 | 120 | Doughnut | 100 | 113 | 120 | 33 | 65 | 80 | 71 |
| 8 | 113 | 120 | Doughnut | 7 | 113 | 120 | 7 | 30 | 107 | 95 |
| 9 | 113 | 120 | Doughnut | 7 | 113 | 120 | 53 | 82 | 60 | 53 |
| 10 | 80 | 101 | Circle | 7 | 80 | 101 | — | — | 80 | 100 |

Example 8

The containers 1–6 obtained in conjunction with the examples 1–6 were filled with water of 300 ml each and heated by the electromagnetic cooking heater and the microwave oven. The heat value at this moment was measured and the results are shown in Table 2.

TABLE 2

| | Heat value of each container | | |
|---|---|---|---|
| | | Heat value (Kcal/min.) | |
| | | Electromagnetic cooking heater | Microwave oven |
| Example 8 | Container 1 | 7.2 | 3.3 |
| | Container 2 | 9.6 | 3.4 |
| | Container 3 | 7.0 | 3.3 |
| | Container 4 | 10.6 | 3.3 |
| | Container 5 | 10.6 | 3.7 |
| | Container 6 | 8.2 | 3.5 |
| Comparative Example 5 | Container 7 | 5.0 | 3.4 |
| | Container 8 | 7.3 | 2.9 |
| | Container 9 | 0 | 3.7 |
| | Container 10 | 7.2 | 3.0 |

Comparative Example 5

The containers 7–10 obtained in conjunction with the comparative examples 1–4 were filled with water of 300 ml each and heated by the electromagnetic cooking heater and the microwave oven. The heat value at this moment was measured and the results are shown in Table 2.

Example 9

Test of a Container Containing Minestrone Soup

Half an onion, half a carrot, one potato, and bacon 150 g, two leaves of cabbage, all cut into dices of 1 cm are fried with half a tablespoon of butter, and then four cups of water and 2 cubes of chicken bouillon are added, and simmered over low heat until vegetables are tender. Then one pimento cut into dices of 1 cm, one canned boiled plane tomato, boiled macaroni 30 g were also added and simmered. Subsequently, salt and pepper are added as needed, and minced parsley was finally added to obtain minestrone cup. The minestrone cup was filled into the containers 1–6, 235 g each, and two sets of those were prepared. They were frozen at −30° C. Subsequently, they were taken out and one set of them are cooked by the electromagnetic cooking heater and the other set was cooked by the microwave oven, and the states of food in the containers and the containers themselves were observed while being heated.

The heating conditions of the electromagnetic cooking heater are shown in Table 3, and the heating conditions of the microwave oven are shown in Table 4.

Comparative Example 7

The procedure was as shown in Example 9 except that the containers 7–10 were used.

Example 10

Instant seaweed soup 18 g was put into each of the containers 1–6, and 200 ml each of boiled water was added to obtained seaweed soup. Two sets of these were prepared. One set of them was cooked by the electromagnetic cooking heater and the other set was cooked by the microwave oven. The conditions of food in the containers and the containers themselves were observed while being heated. The heating conditions of the electromagnetic cooking heater are shown in Table 3, and the heating conditions of the microwave oven are shown in Table 4.

Comparative Example 8

The procedure was the same as Example 10 except that the containers 7–10 were used.

TABLE 3

Condition of container and food in the container upon heating due to electromagnetic cooking heater.

|  |  | Minestrone soup | Seaweed soup | Cream stew |
|---|---|---|---|---|
| Viscosity at 60° C. |  | 130 cp | 13 cp | 145 cp |
| Example 9 Example 10 | Container 1 | No problem | No problem | Hole defect & burning on the container |
| Comparative Example 9 | Container 2 | No problem | No problem | Hole defect & burning on the container |
|  | Container 3 | No problem | No problem | Hole defect & burning on the container |
|  | Container 4 | No problem | No problem | Hole defect & burning on the container |
|  | Container 5 | No problem | No problem | Hole defect & burning on the container |
|  | Container 6 | No problem | No problem | Hole defect & burning on the container |
| Comparative Example 7 | Container 7 | Hole defect & burning on the container | Hole defect & burning on the container | Hole defect & burning on the container |
| Comparative Example 8 | Container 8 | No problem | No problem | Hole defect & burning on the container |
| Comparative Example 9 | Container 9 | No heat was generated | No heat was generated | No heat was generated |
|  | Container 10 | No problem | No problem | Hole defect & burning on the container |

TABLE 4

Condition of container and food in the container upon heating due to microwave oven.

|  |  | Minestrone soup | Seaweed soup | Cream stew |
|---|---|---|---|---|
| Example 9 | Container 1 | No problem | No problem | No problem |
| Example 10 | Container 2 | No problem | No problem | No problem |
| Comparative Example 9 | Container 3 | No problem | No problem | No problem |
|  | Container 4 | No problem | No problem | No Problem |
|  | Container 5 | No problem | No problem | No problem |
|  | Container 6 | No problem | No problem | No problem |
| Comparative Example 7 | Container 7 | No problem | No problem | No problem |
|  | Container 8 | Not thawed after 10 min. | Not thawed after 10 min. | Not thawed after 10 min. |
| Comparative Example 8 | Container 9 | No problem | No problem | No problem |
| Comparative Example 9 | Container 10 | Not thawed after 10 min. | Not thawed after 10 min. | Not thawed after 10 min. |

Comparative Example 9

2.5 cups of flour were put into a pan, and fried with two tablespoons of butter, and then two cups of milk, salt, and pepper were added as needed. With another pan, pork leg 300 g was fried, and then peeled two potatoes, radially cut ½ onion, eight mushrooms each cut vertically into two pieces, random cut ½ carrot are added thereto and fried again. Water was added thereto and stewed over low heat. Then, the soup previously cooked was added thereto with salt and pepper, and continued to stew, and then ½ Italian broccoli boiled with salted water was added to obtain cream stew. The obtained cream stew was filled in the containers 1–10, 235 g each. Two sets of those were prepared. They were frozen at −30° C. Subsequently, they are taken out and one of the sets was cooked in the electromagnetic cooking heater and the other set was cooked by the microwave oven. The conditions of food in the containers and the containers themselves were observed while being heated. The heating conditions of the electromagnetic cooking heater are shown in Table 3, and the heating conditions of the microwave oven are shown in Table 4.

With the electromagnetic cooking heater, the minestrone soup and the seaweed soup could be thawed without problems. In case of the cream stew, since the viscosity is high, the container was burned, or formed with a hole. With the microwave oven, the food could not thawed completely even after 10 minutes. The reason may be because microwave comes into the container, not from the side, but in the oblique direction, even when the diameter of the container 10 is shorter than the wavelength of the microwave, the passing distance of the microwaves in the container becomes longer than the wavelength correspondingly.

The present invention advantageously provides a container commonly usable for electromagnetic cooking heater and microwave ovens, being superior in heating efficiency and evenly heating property for the contents was obtained.

The invention claimed is:

1. A container usable in both electromagnetic induction cooking heaters and microwave ovens, said container comprising a resin container having a thin, aluminum film on a bottom thereof, wherein the aluminum film has a thickness between 5 to 30 μm and an area of at least 70 cm², wherein the aluminum film has no projection of less than 2 cm in curvature radius over an entire surface of the aluminum film, and wherein the bottom of the container is covered by the aluminum film over 30 to 80% of the entire area thereof.

2. The container according to claim 1, wherein the aluminum film includes a hollow portion having a diameter of no greater than 6 cm.

3. The container according to claim 1, wherein the aluminum film has a heat value of at least 7.0 kcal/min when being used in an electromagnetic induction cooking heater with an output of at least 1 kW and at least 3.3 kcal/min when being used in a microwave oven with an output of at least 0.4 kW.

4. The container according to claim 2, wherein the aluminum film has a heat value of at least 7.0 kcal/min when being used in an electromagnetic induction cooking heater with an output of at least 1 kW and at least 3.3 kcal/min when being used in a microwave oven with an output of at least 0.4 kW.

5. The container according to claim 1, wherein the resin container is configured to store food therein that contains a liquid component of at least 30 weight percent, and a viscosity of the liquid component is no greater than 130 cp at a temperature of 60° C.

6. The container according to claim 2, wherein the resin container is configured to store food therein that contains a liquid component of at least 30 weight percent, and a viscosity of the liquid component is no greater than 130 cp at a temperature of 60° C.

7. The container according to claim 3, wherein the resin container is configured to store food therein that contains a liquid component of at least 30 weight percent, and a viscosity of the liquid component is no greater than 130 cp at a temperature of 60° C.

8. The container according to claim 4, wherein the resin container is configured to store food therein that contains a liquid component of at least 30 weight percent, and a viscosity of the liquid component is no greater than 130 cp at a temperature of 60° C.

* * * * *